(12) United States Patent
Sztuk et al.

(10) Patent No.: US 11,188,148 B2
(45) Date of Patent: Nov. 30, 2021

(54) USER INTERACTION IN HEAD-MOUNTED DISPLAY WITH EYE TRACKING

(71) Applicant: Facebook Technologies, LLC, Menlo Park, CA (US)

(72) Inventors: Sebastian Sztuk, Menlo Park, CA (US); Javier San Agustin Lopez, Palo Alto, CA (US); Martin Henrik Tall, Redwood City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 10 days.

(21) Appl. No.: 16/400,948

(22) Filed: May 1, 2019

(65) Prior Publication Data

US 2020/0209958 A1 Jul. 2, 2020

Related U.S. Application Data

(60) Provisional application No. 62/785,622, filed on Dec. 27, 2018.

(51) Int. Cl.
*G06F 3/01* (2006.01)
*G06T 19/00* (2011.01)
(Continued)

(52) U.S. Cl.
CPC .......... *G06F 3/013* (2013.01); *G02B 27/0093* (2013.01); *G02B 27/0172* (2013.01); *G06F 3/017* (2013.01); *G06T 19/006* (2013.01)

(58) Field of Classification Search
CPC ........ G06F 3/013; G06F 3/017; G06F 3/0486; G06F 2203/04801; G06F 2200/1637; G02B 27/0093; G02B 27/0172; G06T 19/006

See application file for complete search history.

(56) References Cited

U.S. PATENT DOCUMENTS 5,641,288 A * 6/1997 Zaenglein, Jr. ....... F41G 3/2633
434/17
9,292,089 B1 * 3/2016 Sadek .................... G06F 3/016
(Continued)

FOREIGN PATENT DOCUMENTS

WO 2018/005690 A1 1/2018

OTHER PUBLICATIONS

Conan O'Brian testing Wilsons Heart, failing badly at throwing—posted on YouTube Apr. 27, 2017. Printout of YouTube page enclosed and the YouTube link is below. https://youtu.be/FKRMVeoY_U8?t=1m55s.

(Continued)

*Primary Examiner* — Nhat Huy T Nguyen
(74) *Attorney, Agent, or Firm* — Pequignot + Myers; Matthew A. Pequignot

(57) ABSTRACT

A virtual reality (VR) system includes a console an imaging device, a head mounted display (HMD) and a user input device. The console includes a virtual reality (VR) engine, a tracking module and an application store. The HMD includes a display element configured to display content to a user wearing the HMD. The virtual reality engine is configured to determine a vector for a virtual object thrown at a target in response to physical input from the user, a gaze vector for the eyes of the user and a virtual object position vector for the target and modify the vector for the virtual object based on at least one of the gaze vector and the virtual object position vector. The virtual reality engine may also be configured to determine a virtual object position vector for a virtual object to be thrown at a target, a gaze vector for the eyes of the user and a virtual object position vector for a virtual rendering of the user's hand and enabling user input to pick up the virtual object based on at least one of the gaze (Continued)

vector and the virtual object position vector of the virtual rendering of the user's hand.

15 Claims, 6 Drawing Sheets

(51) Int. Cl.
  *G02B 27/01* (2006.01)
  *G02B 27/00* (2006.01)

(56) References Cited

U.S. PATENT DOCUMENTS

| | | | |
|---|---|---|---|
| 2005/0047629 A1* | 3/2005 | Farrell | G06F 3/0481 382/117 |
| 2012/0272179 A1* | 10/2012 | Stafford | G06F 3/038 715/781 |
| 2013/0335303 A1 | 12/2013 | Maciocci et al. | |
| 2016/0179336 A1* | 6/2016 | Ambrus | G02B 27/017 715/768 |
| 2017/0123492 A1* | 5/2017 | Marggraff | H04N 5/247 |
| 2018/0157398 A1 | 6/2018 | Kaehler et al. | |
| 2019/0155384 A1* | 5/2019 | Fajt | G06F 3/0481 |

OTHER PUBLICATIONS

Blog posting by Charlie Deck on Nov. 18, 2016—:Why Throwing in VR Sucks—and How to Make it Better https://www.gamasutra.com/blogs/CharlieDeck/20161118/285808/Why_Throwing_in_VR_Sucksand_How_to_Make_it_Better.php.
Blog posting by Matt Newport on May 21, 2016—"Hand Tracked Controls in VR—Throwing" http://blog.mattnewport.com/hand-tracked-controls-in-vr-throwing/.
PCT/US2019/068264 PCT Search Report dated Mar. 18, 2020.
International Preliminary Report on Patentability for International Application No. PCT/US2019/068264, dated Jul. 8, 2021, 09 Pages.

* cited by examiner

USER INTERACTION IN HEAD-MOUNTED DISPLAY WITH EYE TRACKING

REFERENCE TO RELATED APPLICATION

The present application claims priority from U.S. Provisional Application No. 62/785,622 filed on Dec. 27, 2018, and incorporated herein by reference in its entirety.

TECHNICAL FIELD

This description generally relates to head-mounted displays (HMDs), and specifically relates to using eye tracking in a HMD with user interaction.

BACKGROUND

Head-mounted displays (HMDs) can be used to present virtual scenery to a user, or to augment real scenery with dynamic information, data, or virtual objects. The virtual reality (VR) or augmented reality (AR) scenery can be three-dimensional to enhance the experience and to match virtual objects to real objects observed by the user. Eye position and gaze direction, and/or orientation of the user in space may be tracked in real time, and the displayed scenery may be dynamically adjusted depending on the user's head orientation and gaze direction, to provide a better experience of immersion into a simulated or augmented environment.

Eye tracking may operate by obtaining real-time images of both eyes with dedicated eye-tracking cameras. The real-time eye images are processed to determine position and orientation of each eye, allowing an AR/VR system to determine the gaze direction and gaze distance, i.e. a gaze vector. Hand tracking may also be used in a VR system to track position and orientation of user's hands. The hands tracking tends to have lower fidelity and greater position errors and time lags. This may prove challenging for AR/VR tasks requiring quick hand movements, e.g. throwing virtual objects.

SUMMARY

The present application uses gaze direction of the user's eye to determine a convergence point in combination with additional user input to enhance a user's interaction with the system. Convergence of the eyes can be used to determine depth in virtual space in the VR or real depth in AR. Where a person is looking involves a x,y,z point in a VR scene or in the real world in AR. For example, the convergence point of the user's gaze direction may be used to more accurately render images involved with activities such as object pick up or object throwing.

In accordance with the present disclosure, there is provided an AR/VR system including a head-mounted display (HMD) having an eye-tracking system and a display module for displaying content to a user wearing the HMD and a console having an AR/VR engine. The AR/VR engine configured to determine a displacement vector for a virtual object thrown at a target in response to physical input from the user determine a gaze vector for eyes of the user using the eye-tracking system and modify the displacement vector based on the gaze vector.

In accordance with the present disclosure, there is provided in an AR/VR system including a head-mounted display (HMD) having an eye-tracking system and a display module for displaying content to a user wearing the HMD and a console having an AR/VR engine, a method including determining a displacement vector for a virtual object thrown at a target in response to physical input from the user, determining a gaze vector for eyes of the user using the eye-tracking system and modifying the displacement vector based on the gaze vector.

A computer product comprising a non-transitory computer usable medium including a computer-readable program which when executed on a computer configures the computer to determine a displacement vector for a virtual object thrown at a target in response to physical input from the user, determine a gaze vector for eyes of the user using the eye-tracking system and modify the displacement vector based on the gaze vector.

The figures depict embodiments of the present disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

The term AR/VR used herein includes AR systems, VR systems, any combination thereof, including Mixed reality (MR) systems. Examples of AR/VR systems will be given further below.

System Environment

Figure 1:
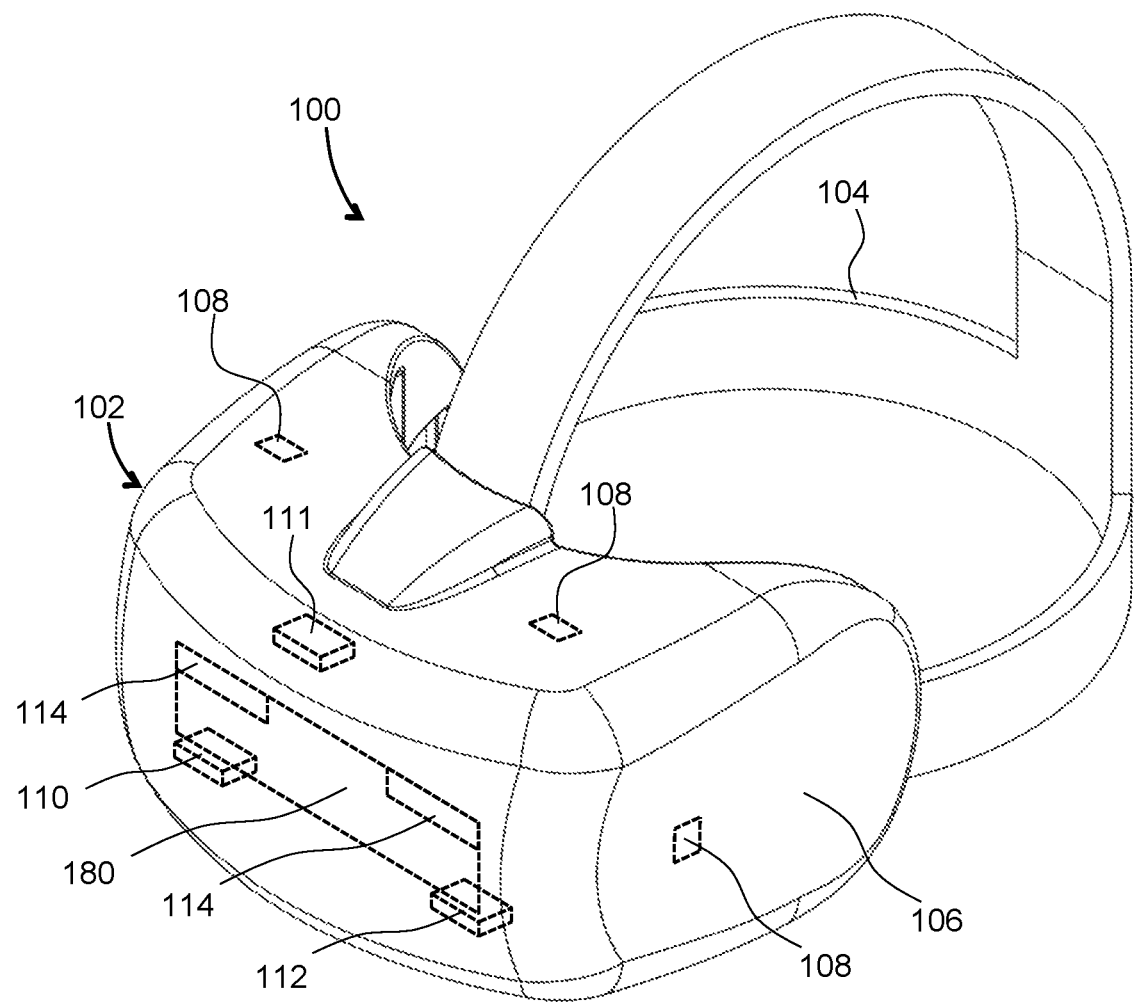
FIG. 1 is a perspective drawing of a head mounted display (HMD) in accordance with an embodiment of the present disclosure.

Referring to FIG. 1, an HMD 100 is an example of an AR/VR wearable display system which encloses the user's face, for a greater degree of immersion into the AR/VR environment. The function of the HMD 100 is to augment views of a physical, real-world environment with computer-generated imagery, and/or to generate the entirely virtual 3D imagery. The HMD 100 may include a front body 102 and a band 104. The front body 102 is configured for placement in front of eyes of a user in a reliable and comfortable manner, and the band 104 may be stretched to secure the front body 102 on the user's head. A display module 180 may be disposed in the front body 102 for presenting AR/VR imagery to the user. Sides 106 of the front body 102 may be opaque or transparent.

In some embodiments, the front body 102 includes locators 108 and an inertial measurement unit (IMU) 110 for tracking acceleration of the HMD 100, and position sensors 112 for tracking position of the HMD 100. The IMU 110 is an electronic device that generates data indicating a position of the HMD 100 based on measurement signals received from one or more of position sensors 112, which generate one or more measurement signals in response to motion of the HMD 100. Examples of position sensors 112 include: one or more accelerometers, one or more gyroscopes, one or more magnetometers, another suitable type of sensor that detects motion, a type of sensor used for error correction of the IMU 110, or some combination thereof. The position sensors 112 may be located external to the IMU 110, internal to the IMU 110, or some combination thereof.

The locators 108 are traced by an external imaging device of a virtual reality system, such that the virtual reality system can track the location and orientation of the entire HMD 100. Information generated by the IMU 110 and the position sensors 112 may be compared with the position and orientation obtained by tracking the locators 108, for improved tracking accuracy of position and orientation of the HMD 100. Accurate position and orientation is important for presenting appropriate virtual scenery to the user as the latter moves and turns in 3D space.

The HMD 100 may further include a depth camera assembly (DCA) 111, which captures data describing depth information of a local area surrounding some or all of the HMD 100. To that end, the DCA 111 may include a laser radar (LIDAR), or a similar device. The depth information may be compared with the information from the IMU 110, for better accuracy of determination of position and orientation of the HMD 100 in 3D space.

The HMD 100 may further include an eye-tracking system 114 for determining orientation and position of user's eyes in real time. The eye-tracking system 114 may include an array of infrared illuminators illuminating both eyes, a hot mirror for separating infrared and visible light, and an eye tracking camera obtaining images of both eyes with reflections (glints) from the illuminators. By comparing the position of glints relative to the position of the eye pupil, the eye position and orientation may be determined. The obtained position and orientation of the eyes also allows the HMD 100 to determine the gaze direction of the user and to adjust the image generated by the display module 180 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 102.

Figure 2:
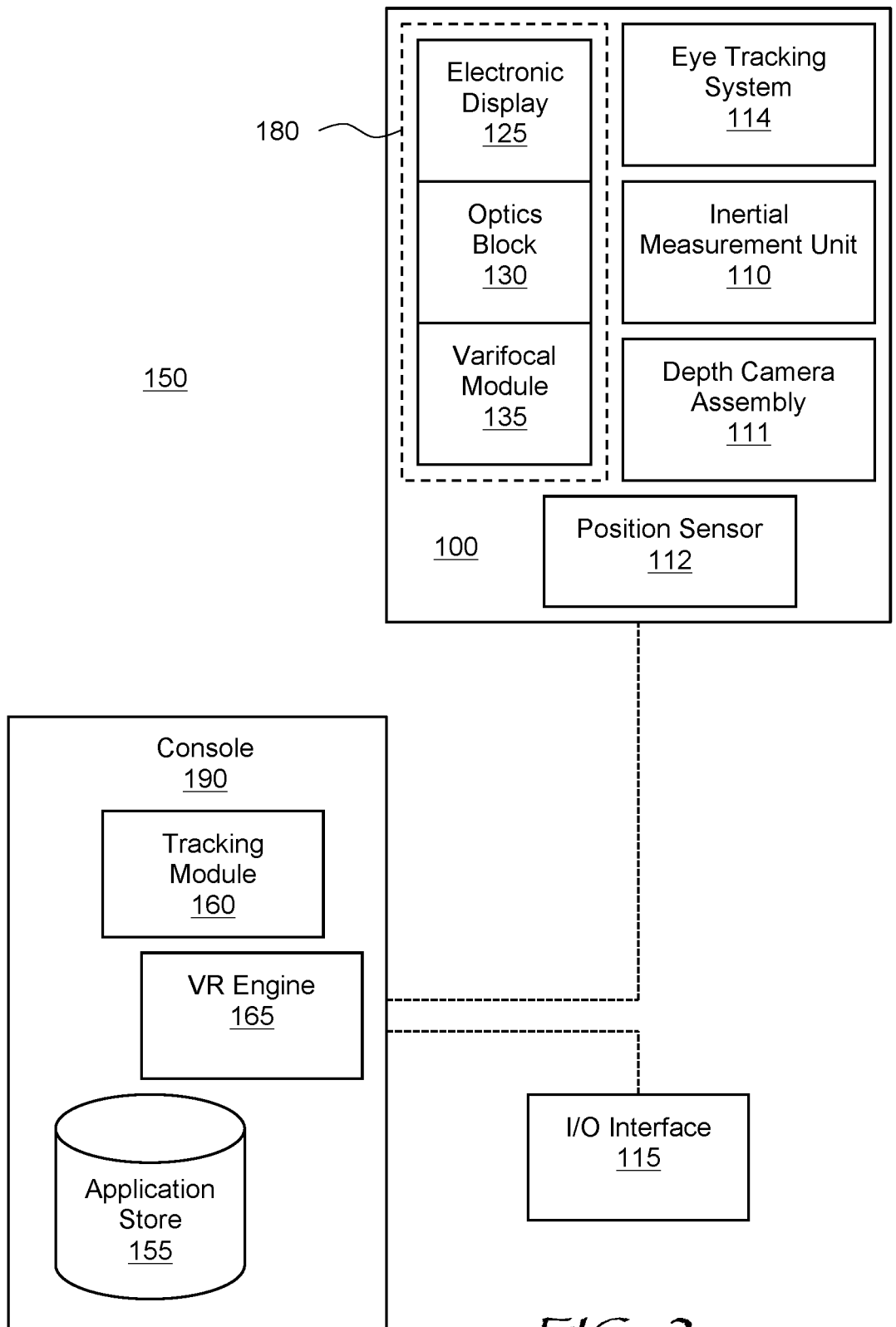
FIG. 2 is a block diagram of an AR/VR system in accordance an embodiment of the present disclosure.

FIG. 2 shows an AR/VR system 150, which includes the HMD 100 of FIG. 1, an external console 190 storing various AR/VR applications, setup and calibration procedures, 3D videos, etc., and an input/output (I/O) interface 115 for operating the console 190 and/or interacting with the AR/VR environment. The HMD 100 may be "tethered" to the console 190 with a physical cable, or connected to the console 190 via a wireless communication link such as Bluetooth®, Wi-Fi, etc. There may be multiple HMDs 100, each having an associated I/O interface 115, with each HMD 100 and I/O interface(s) 115 communicating with the console 190. In alternative configurations, different and/or additional components may be included in the AR/VR system 150. Additionally, functionality described in conjunction with one or more of the components shown in FIGS. 1 and 2 may be distributed among the components in a different manner than described in conjunction with FIGS. 1 and 2 in some embodiments. For example, some or all of the functionality of the console 115 may be provided by the HMD 100, and vice versa. The HMD 100 may be provided with a processing module capable of achieving such functionality.

As described above with reference to FIG. 1, the HMD 100 may include the eye-tracking system 114 (FIG. 2) for tracking eye position and orientation, determining gaze angle and convergence angle, etc., the IMU 110 for determining position and orientation of the HMD 100 in 3D space, the DCA 111 for capturing the outside environment, the position sensor 112 for independently determining the position of the HMD 100, and the display module 180 for displaying AR/VR content to the user. The display module 180 includes (FIG. 2) an electronic display 125, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a waveguide display, a projector, or a combination thereof. The display module 180 further includes an optics block 130, whose function is to convey the images generated by the electronic display 125 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display module 180 may further include a varifocal module 135, which may be a part of the optics block 1130. The function of the varifocal module 135 is to adjust the focus of the optics block 130 e.g. to compensate for vergence-accommodation conflict, to correct for vision defects of a particular user, to offset aberrations of the optics block 130, etc.

The I/O interface 115 is a device that allows a user to send action requests and receive responses from the console 190. An action request is a request to perform a particular action. For example, an action request may be an instruction to start or end capture of image or video data or an instruction to perform a particular action within an application. The I/O interface 115 may include one or more input devices, such as a keyboard, a mouse, a game controller, or any other suitable device for receiving action requests and communicating the action requests to the console 190. An action request received by the I/O interface 115 is communicated to the console 190, which performs an action corresponding to the action request. In some embodiments, the I/O interface 115 includes an IMU that captures calibration data indicating an estimated position of the I/O interface 115 relative to an initial position of the I/O interface 115. In some embodiments, the I/O interface 115 may provide haptic feedback to the user in accordance with instructions received from the console 190. For example, haptic feedback can be provided when an action request is received, or the console 190 communicates instructions to the I/O interface 115 causing the I/O interface 115 to generate haptic feedback when the console 190 performs an action.

The console 190 may provide content to the HMD 100 for processing in accordance with information received from one or more of: the IMU 110, the DCA 111, the eye-tracking system 114, and the I/O interface 115. In the example shown in FIG. 2, the console 190 includes an application store 155, a tracking module 160, and a VR engine 165. Some embodiments of the console 190 may have different modules or components than those described in conjunction with FIG. 2. Similarly, the functions further described below may be distributed among components of the console 190 in a different manner than described in conjunction with FIGS. 1 and 2.

The application store 155 may store one or more applications for execution by the console 190. An application is a group of instructions that, when executed by a processor, generates content for presentation to the user. Content generated by an application may be in response to inputs received from the user via movement of the HMD 100 or the I/O interface 115. Examples of applications include: gaming applications, presentation and conferencing applications, video playback applications, or other suitable applications.

The tracking module 160 may calibrate the AR/VR system 150 using one or more calibration parameters and may adjust one or more calibration parameters to reduce error in determination of the position of the HMD 100 or the I/O interface 115. Calibration performed by the tracking module 160 also accounts for information received from the IMU 110 in the HMD 100 and/or an IMU included in the I/O interface 115, if any. Additionally, if tracking of the HMD 100 is lost, the tracking module 160 may re-calibrate some or all of the AR/VR system 150.

The tracking module 160 may track movements of the HMD 100 or of the I/O interface 115, the IMU 110, or some combination thereof. For example, the tracking module 160 may determine a position of a reference point of the HMD 100 in a mapping of a local area based on information from the HMD 100. The tracking module 160 may also determine positions of the reference point of the HMD 100 or a reference point of the I/O interface 115 using data indicating a position of the HMD 100 from the IMU 110 or using data indicating a position of the I/O interface 115 from an IMU included in the I/O interface 115, respectively. Furthermore, in some embodiments, the tracking module 160 may use portions of data indicating a position or the HMD 100 from the IMU 110 as well as representations of the local area from the DCA 111 to predict a future location of the HMD 100. The tracking module 160 provides the estimated or predicted future position of the HMD 100 or the I/O interface 115 to the VR engine 165.

The VR engine 165 may generate a 3D mapping of the area surrounding some or all of the HMD 100 ("local area") based on information received from the HMD 100. In some embodiments, the VR engine 165 determines depth information for the 3D mapping of the local area based on information received from the DCA 111 that is relevant to techniques used in computing depth. In various embodiments, the VR engine 165 may use the depth information to update a model of the local area and generate content based in part on the updated model.

The VR engine 165 executes applications within the AR/VR system 150 and receives position information, acceleration information, velocity information, predicted future positions, or some combination thereof, of the HMD 100 from the tracking module 160. Based on the received information, the VR engine 165 determines content to provide to the HMD 100 for presentation to the user. For example, if the received information indicates that the user has looked to the left, the VR engine 165 generates content for the HMD 100 that mirrors the user's movement in a virtual environment or in an environment augmenting the local area with additional content. Additionally, the VR engine 165 performs an action within an application executing on the console 190 in response to an action request received from the I/O interface 115 and provides feedback to the user that the action was performed. The provided feedback may be visual or audible feedback via the HMD 100 or haptic feedback via the I/O interface 115.

In some embodiments, based on the eye tracking information (e.g., orientation of the user's eyes) received from the eye-tracking system 114, the VR engine 165 determines resolution of the content provided to the HMD 100 for presentation to the user on the electronic display 125. The VR engine 165 may provide the content to the HMD 100 having a maximum pixel resolution on the electronic display 125 in a foveal region of the user's gaze. The VR engine 165 may provide a lower pixel resolution in other regions of the electronic display 125, thus lessening power consumption of the AR/VR system 150 and saving computing resources of the console 190 without compromising a visual experience of the user. In some embodiments, the VR engine 165 can further use the eye tracking information to adjust where objects are displayed on the electronic display 125 to prevent vergence-accommodation conflict and/or to offset optical distortions and aberrations.

Eye Tracking-Assisted User-Object Interaction

Figure 3:
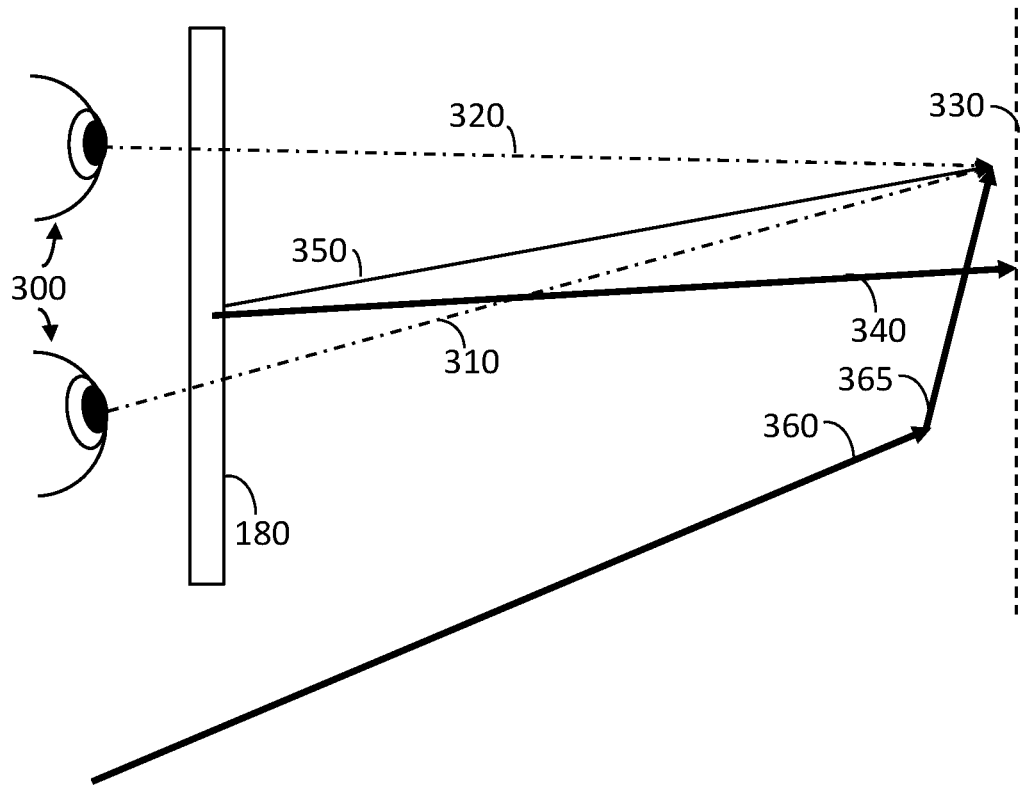
FIG. 3 is a schematic top view of a user, represented by eyes 300, viewing a scene presented by the display system in accordance with an embodiment of the present disclosure.
Figure 3:
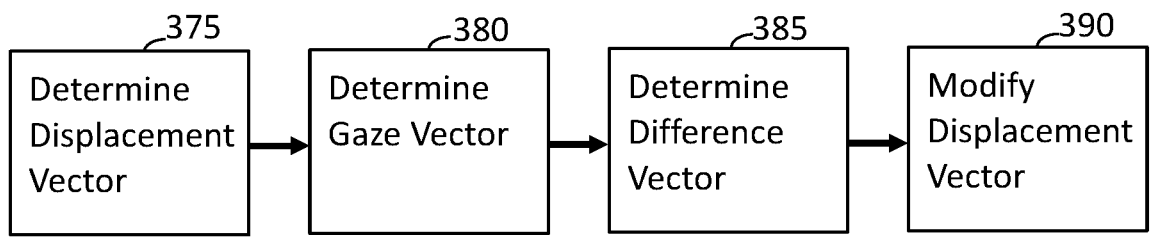

The eye-tracking system 114 may also be used to determine a point at which the user's eyes are looking. FIG. 3 illustrates a user, represented by eyes 300, viewing a scene presented by the display module 180. Sight lines 310 and 320 from each eye 300 are determined by the eye-tracking system 114 to a point in three-dimensional space (x, y, z) defining a gaze vector 350. FIG. 3 presents a simplified two-dimensional representation for illustrative purposes. A plane 330 represents a location at which a virtual target appears having a virtual target position vector 340 extending from the display module 180 to the virtual target. The virtual target position vector 340 has a distance component, i.e. the length of the vector, and a direction component. The present application uses the gaze vector 350 defined by the intersection of the sight lines 310 and 320. The gaze vector 350 is a displacement vector that extends from the user's HMD 180 generally towards the plane 330 of the virtual target. The gaze vector 350 includes a distance component, i.e. a length of the gaze vector, and a direction component, i.e. an overall direction of the gaze by the eyes 300. The VR engine 165 may use physical input from the I/O interface 115, for example input from a controller or movement of the controller, to determine a displacement vector 360 for a virtual object thrown by the user at the virtual target. For example, a user's hand movement of a hand-held controller may be used to determine a velocity vector and a resultant displacement vector for the virtual object. As shown in FIG. 3, the displacement vector 360 may not reach the plane 330 of a presented virtual target. A difference vector 365 between the end of the displacement vector 360 and the end of the gaze vector 350 may be determined by the AR/VR engine and then used to modify the displacement vector 360 to improve accuracy of the throw. FIG. 3 illustrates an example of a process with a process block 375 determining a displacement vector 360 for the virtual object being thrown. A process block 380 determines the gaze vector 350. A process block 385 determines the difference vector 365. And a process block 390 modifies the displacement vector 360 based upon the difference vector 365. Further uses of the gaze vector 350 are discussed herein below with reference to FIGS. 4 and 5.

Figure 4:
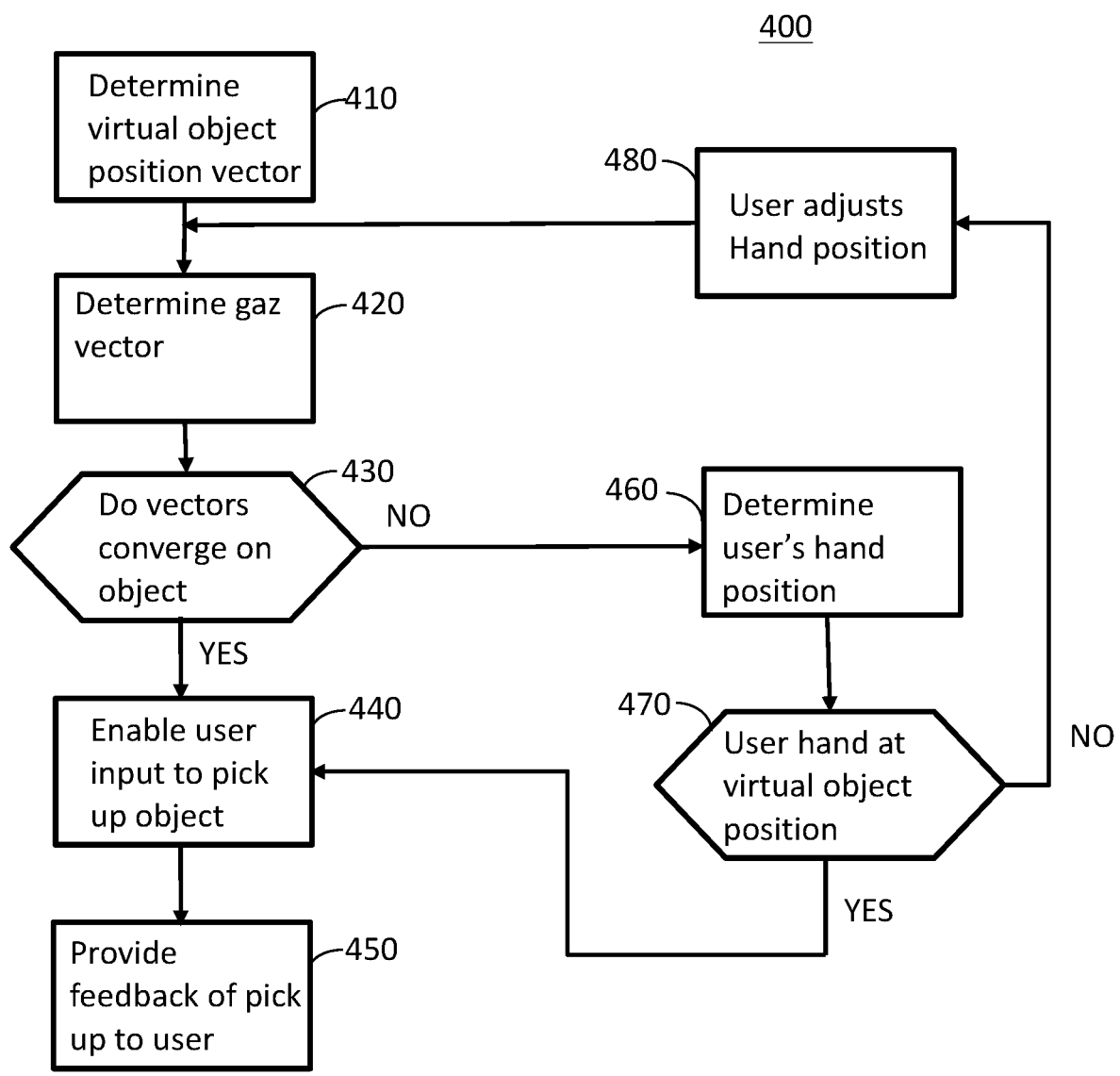
FIG. 4 is a flow chart combining user gaze and user interaction for a first task in accordance with an embodiment of the present disclosure.

FIG. 4 is a flow chart for combining user gaze and user interaction for a first task, e.g. picking up the virtual object for throwing, in accordance with an embodiment of the present disclosure. The flow chart illustrates a procedure 400 for using the gaze vector of a user's gaze to more effectively implement desired outcomes. In a process block 410, the virtual object position vector to a virtual object to be picked up is determined, also known as a location vector of the virtual object. Then a process block 420 determines the user's gaze vector, that is where the user is looking within the presented scene. A decision block 430 queries if a modulus of difference between the virtual object position vector of the virtual object to be picked up and the gaze vector for the user is less than a predetermined distance. That is, do the virtual object position vector for the object to be picked up and hand position in depth for the user terminate within a predetermined distance. For example, the user looks at a ball to be thrown and may move a hand controller to pick up the ball. The object gaze convergence vector may more accurately predict the hand position than provided by hand movement sensors. In another embodiment, for example how far the gaze vector passes from the object location, if within a predetermined amount control input may be used rather than the depth of the hand position. If YES, a process block 440 enables a user control input to effect pick up of the object and a process block 450 provides feedback to the user that the virtual object has been picked up. If NO for the decision block 430, a process block 460 determines a user's hand position. Then a decision block 470 determines whether the hand is at the virtual object position. If YES, the user input is enabled as represented by the process block 440. If NO, the user adjusts their hand position and the procedure returns to the step represented by process block 420.

In this way, once the object gaze vector is known, it may be used to effect more accurate actions of the user. Thus, if the received information indicates that the user is looking at the object, the VR engine 165 generates content for the HMD 100 that mirrors the user's hand movement in the system environment to reflect that the rendered hand image moves to a position coincident with that of the virtual object to be picked up as indicated by the location vector of the virtual object. When such coincidence occurs, the VR engine 165 performs an action within an application executing on the console 190 in response to an action request received from the I/O interface 115 and provides feedback to the user that the action was performed. For example, the provided feedback includes visual or audible feedback via the HMD 100 or haptic feedback via the I/O interface 115. In the event that the user's gaze is not directed at the object to be picked up, for example looking at a target while attempting to grasp an object for throwing at the target, the position or virtual object position vector for the virtual hand and object may be used to determine coincidence, thereby ensuring object pickup more accurately.

Figure 5:
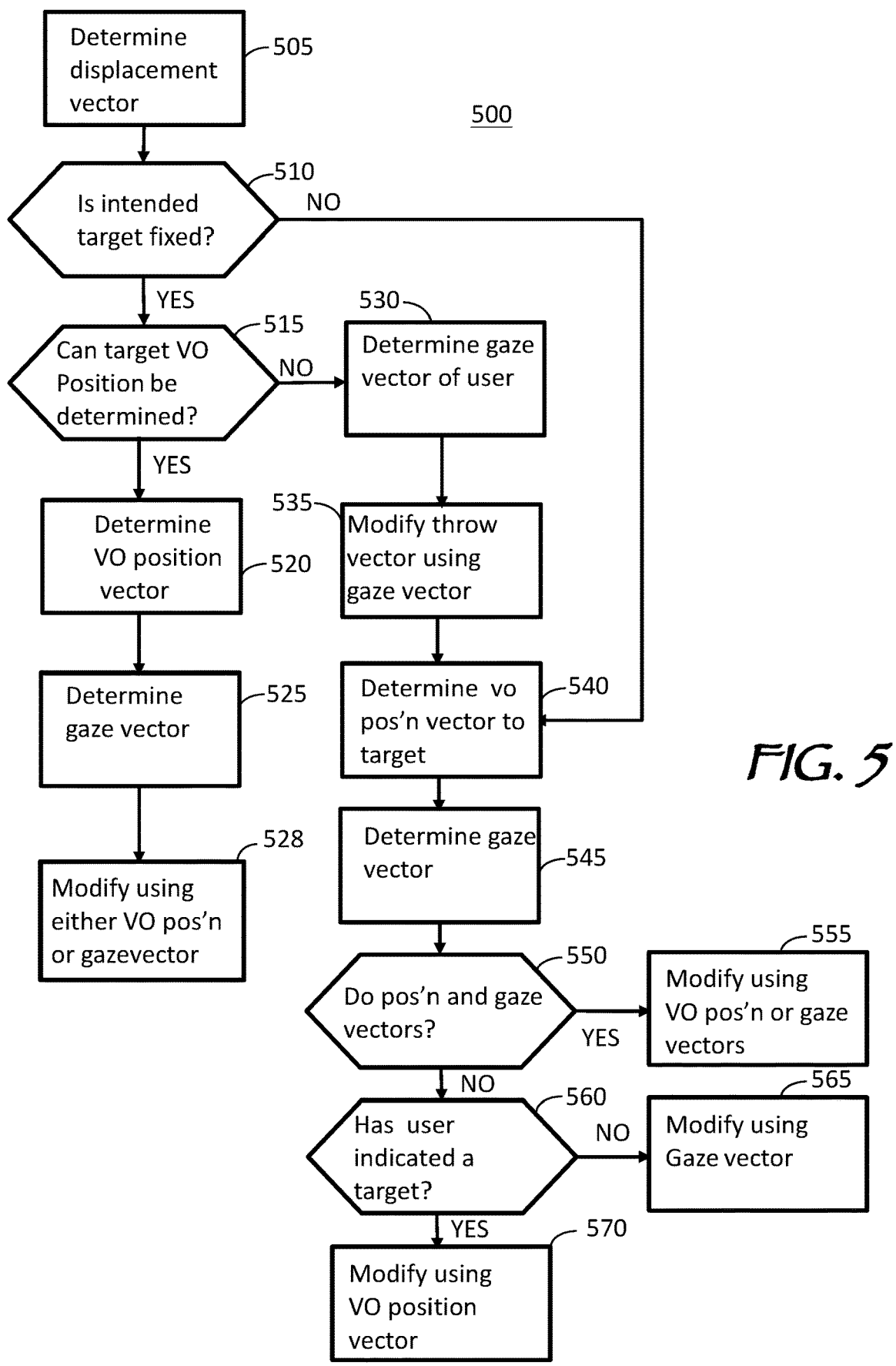
FIG. 5 is a flow chart combining user gaze and user interaction for a second task in accordance with an embodiment of the present disclosure.

FIG. 5 is a flow chart of a process 500 for combining user gaze convergence and user interaction for a second task in accordance with an embodiment of the present disclosure. For example, games of skill, such as throwing objects at a fixed target have proven challenging to represent in VR and AR environments because of the lack of physical feedback from the mass of the object being thrown, and because of technical difficulties associated with real-time determination of hand location and speed when performing quick hand movements, such as throwing movements. In order to provide more accuracy for a resulting displacement of a thrown object, the present disclosure provides strategies to modify a displacement vector determined solely from a user's physical input. The process 500 uses various environment dependent strategies to improve throwing accuracy.

The process 500 first determines the displacement vector 360 of a thrown virtual object based on a user's physical input, for example movement of a hand controller as represented by a process block 505. A decision block 510 queries whether the intended target is a fixed target. If YES, a decision block 515 queries whether the virtual object position vector 340 to the target can be determined. If YES, a process block 520 determines the virtual object position vector 340 to the target. A process block 525 determines the gaze vector 350 for the user and a process block 528 modifies the displacement vector 360 of the thrown virtual object from process block 505 using either the virtual object position vector 340 or gaze vector 350. Examples of how the displacement vector may be modified include using a magnitude component of either the virtual object position vector 340 or the gaze vector 350. Alternatively, the displacement vector may be modified include using a direction component of either the virtual object position vector 340 or the gaze vector 350. Another embodiment may use both magnitude and direction components of either the virtual object position vector 340 or the gaze vector 350. For example, using the direction component and a weighting factor for the magnitude. The modification of the displacement vector may be dependent upon a preselected skill level, with the degree of modification increasing in proportion to decreasing skill level. Modification degree may also be a learned attribute. For example, the system may learn from the number of failed attempts to hit the target, that the user requires help until further experience is gained. Then as the user experiences greater success, the degree of modification may be decreased. In this way, the user's enjoyment of the virtual activity may be maintained as skills are obtained. In another example, the magnitude and velocity can be mapped to an object that the user is looking at and the throw can snap to the object for an accurate throw, such as in playing a game of football.

If NO to the decision block 515, a process block 530 determines an eye convergence vector for the user and a process block 535 modifies the displacement vector of the thrown virtual object using the eye convergence vector. Examples of how the displacement vector may be modified include using a magnitude component of the gaze vector. Alternatively, the displacement vector may be modified include using a direction component the gaze vector. Another embodiment may use both magnitude and direction components of the gaze vector, for example, by using the direction component and a weighting factor for the magnitude. The modification of the displacement vector may be dependent upon a preselected skill level, with the degree of modification increasing in proportion to decreasing skill level. Modification degree may also be a learned attribute. For example, the system may learn from the number of failed attempts to hit the target, that the user requires help until further experience is gained. Then as the user experiences great success, the degree of modification may be decreased. In this way, the user's enjoyment of the virtual activity may be maintained as skills are obtained.

The process 500, steps 505 through 535 may be applied to various games of skill, for example bean bag toss, darts, and axe throwing. For the fixed target example, the process block 520 implies that the target is not obscured. Typically, the user's gaze would be directed at the target. In this example, the process block 528 may use the gaze vector 350 to modify the displacement vector 360 of the thrown virtual object. However, the scene presented to the user may include distractions that cause the user to look away from the target at the time of throwing; in which case, it may be desirable to modify the displacement vector 360 of the thrown virtual object using the virtual object position vector 340 to provide better throwing accuracy. The application of the modifications of process blocks 528 or 535 may also be dependent upon a preselected skill level, for example novice, intermediate and expert; or they could be implemented as a result of a predetermined number of misses by a user or some other parameter. The NO path from decision block 515 implies that the target is obscured so that its virtual object position vector is not available. In this example, the gaze vector 350 for the user may be used to modify the displacement vector 360 of the thrown virtual object as represented by the process block 535. Examples of how the displacement vector 360 may be modified include using a magnitude component of the gaze vector 350. Alternatively, the displacement vector 360 may be modified include using a direction component the gaze vector 350. Another embodiment may use both magnitude and direction components of the gaze vector 350. For example, using the direction component and a weighting factor for the magnitude. The modification of the displacement vector 360 may be dependent upon a preselected skill level, with the degree of modification increasing in proportion to decreasing skill level. Modification degree may also be a learned attribute. For example, the system may learn from the number of failed attempts to hit the target, that the user requires help until further experience is gained. Then as the user experiences great success, the degree of modification may be decreased. In this way, the user's enjoyment of the virtual activity may be maintained as skills are obtained.

If the target is not fixed as determined by a NO to the decision block 510, the environment includes a moving target scenario. A user's response to a moving target can vary depending upon the situation presented to the user. There are three possible scenarios. First, the user is looking at the moving target. Second, the user is looking ahead of the moving target in anticipation of where the target will be. Third, the user is deliberately not looking at the target. An example of the first scenario may be a user trying to toss a bean bag into a moving bucket, who follows the bucket with their eyes in order to make the throw. An example of the second scenario may be a quarterback throwing down field to a receiver, by looking at a location that anticipates the receiver's location at the time of reception. An example of the third scenario is a user in a team sport play trying to distract an opponent by not looking at an intended pass receiver. Thus, the process 500 continues with a process block 540 to determine a virtual object position vector 340 for the target, a process block 545 to determine a gaze vector 350 for the user and a decision block 550 querying whether those vectors are coincident on the virtual target, in other words is the user is looking at the target. Coincidence may be determined based upon a system parameter or a predetermined user parameter.

A YES to decision block 550, leads to a process block 555 that modifies the displacement vector 360 of the thrown virtual object from process block 505 using either the virtual object position vector 340 of process block 540 or the gaze vector 350 of process block 545. While this process may be used for the first scenario and may desirably use the gaze vector, using the virtual object position vector 340 may be selected as user dependent or user defined parameter.

A NO to decision block 550 could mean either of the second and third scenarios. Either, the user is looking at an anticipated location for the target, the second scenario or the user is trying to fake an opposing player by deliberately not looking at an intended target, the third scenario. A decision block 560 queries whether the user has indicated an intended target. A NO represents the second scenario, in which a process block 565 modifies the displacement vector 360 of the thrown virtual object from process block 505 using the gaze vector 350 of process block 545. That is, the system uses where the user is looking to effect modification of the throw vector.

A YES to the decision block 560 represents the third scenario, where a process block 570 uses the virtual object position vector from the process block 520 to modify the vector of the thrown virtual object from the process block 505. For example, the user wants to make a shovel pass to a player while looking down field to fake out an opposing player.

Regarding the decision block 560, the user may indicate the intended target via several different ways. In the football quarterback scenario, a huddle could be used to indicate the intended target. In a more dynamic situation, for example basketball, a momentary glance by the user to the intended target could be used to indicate the intended target as indicated by a brief change in the gaze vector or the user could provide input through the controller.

Figure 6:
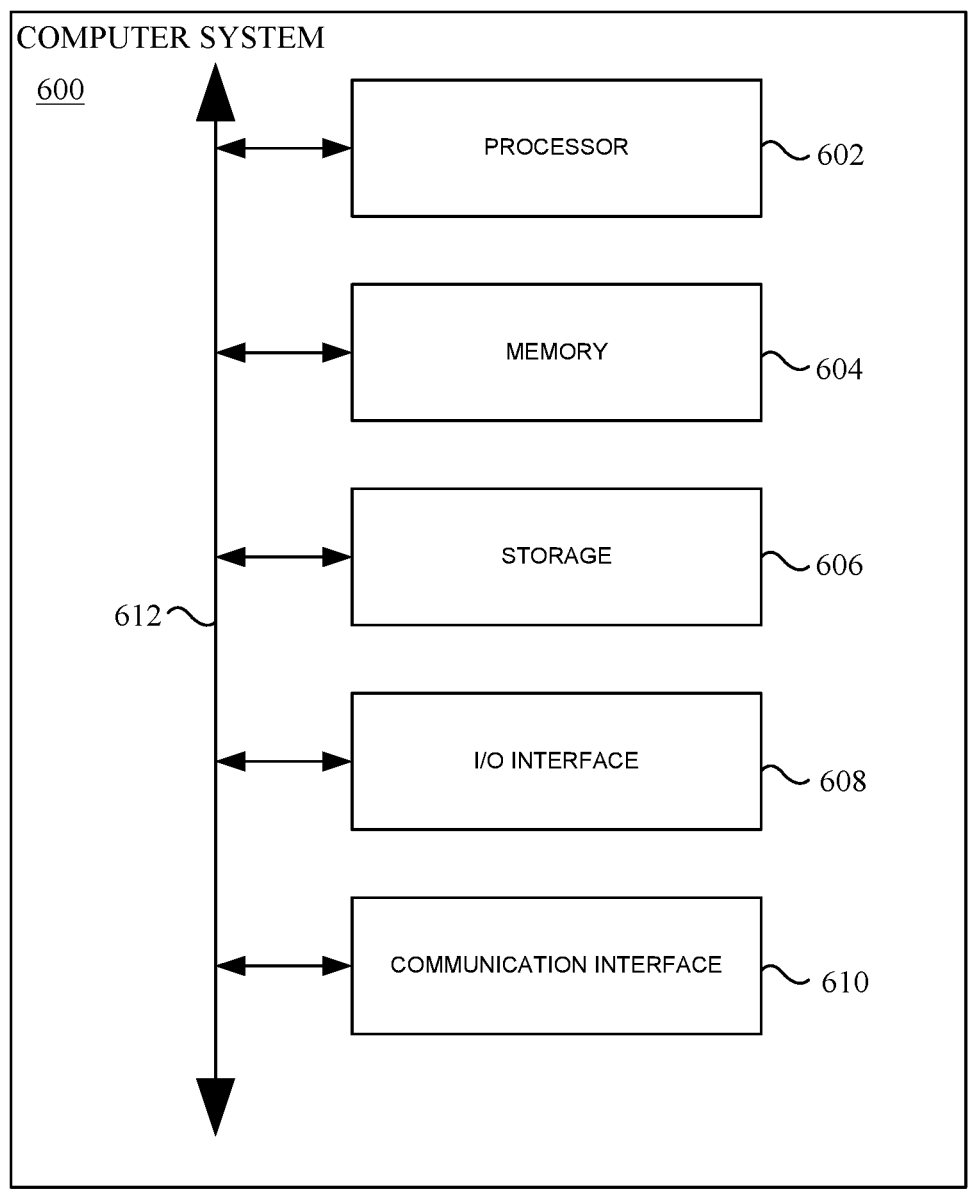
FIG. 6 is a block diagram of a computer system suitable for implementing a method of the present disclosure.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, non-transitory memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, non-transitory memory 604, or storage 606; decode and execute them; and then write one or more results to an internal register, an internal cache, non-transitory memory 604, or storage 606. In particular embodiments, processor 602 may include one or more internal caches for data, instructions, or addresses. Although this disclosure describes and illustrates a particular processor, this disclosure contemplates any suitable processor.

In particular embodiments, the non-transitory memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to the non-transitory memory 604.

In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 02 to memory 604. Bus 612 may include one or more memory buses, as described below. In particular embodiments, one or more memory management units (MMUs) reside between processor 602 and memory 604 and facilitate accesses to memory 604 requested by processor 602. Although this disclosure describes and illustrates particular memory, this disclosure contemplates any suitable memory.

In particular embodiments, storage 606 includes mass storage for data or instructions. Storage 606 may include removable or non-removable (i.e., fixed) media, where appropriate. Storage 606 may be internal or external to computer system 600, where appropriate. In particular embodiments, storage 606 is non-volatile, solid-state memory. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 610 for it. Although this disclosure describes and illustrates a particular communication interface, this disclosure contemplates any suitable communication interface.

In particular embodiments, bus 612 includes hardware, software, or both coupling components of computer system 600 to each other. Although this disclosure describes and illustrates a particular bus, this disclosure contemplates any suitable bus or interconnect.

Herein, reference to a computer-readable storage medium encompasses one or more non-transitory, tangible, computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electro-magnetic signal per se) to the extent that they are not eligible for patent protection under 35 U.S.C. § 101. A computer-readable non-transitory storage medium may be volatile, non-volatile, or a combination of volatile and non-volatile, where appropriate.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof. In one embodiment, a software module is implemented with a computer program product comprising a non-transitory computer-readable medium containing computer program code, which can be executed by a computer processor for performing any or all of the steps, operations, or processes described.

What is claimed is:

1. An AR/VR system comprising:
a head-mounted display (HMD) including an eye-tracking system and a display module for displaying content to a user wearing the HMD; and
a console having an AR/VR engine configured to:
determine a position vector of a virtual object to be picked up, determine a first gaze vector for eyes of the user using the eye-tracking system, and enable a user control input to effect a pick up of the virtual object when the first gaze vector is less than a predetermined distance away from the position vector of the virtual object;
determine a displacement vector for the virtual object thrown at a target in response to physical input from the user,
determine a second gaze vector for the eyes of the user using the eye-tracking system; and
modify the displacement vector so as to lessen a difference between the displacement vector and the second gaze vector.

2. The AR/VR system of claim 1, wherein the AR/VR engine is configured to modify the displacement vector based on a direction component of the second gaze vector.

3. The AR/VR system of claim 1, wherein the difference between the displacement vector and the second gaze vector is lessened by an amount depending upon a skill level of the user.

4. The AR/VR system of claim 1, wherein the target comprises a moving target, and wherein the second gaze vector is determined when the user is looking ahead of the moving target.

5. The AR/VR system of claim 1, wherein the AR/VR engine is further configured to determine a position vector of a hand of the user, and enable a user control input to effect a pick up of the virtual object based on the first gaze vector and the position vector of the hand of the user being within a predetermined distance.

6. In an AR/VR system comprising a head-mounted display (HMD) including an eye-tracking system and a display module for displaying content to a user wearing the HMD, and a console having an AR/VR engine, a method comprising:
determining a position vector of a virtual object to be picked up, determining a first gaze vector for eyes of the user using the eye-tracking system, and enabling a user control input to effect a pick up of the virtual object when the first gaze vector is less than a predetermined distance away from the position vector of the virtual object;
determining a displacement vector for the virtual object thrown at a target in response to physical input from the user,
determining a second gaze vector for the eyes of the user using the eye-tracking system; and
modifying the displacement vector so as to lessen a difference between the displacement vector and the second gaze vector.

7. The method of claim 6, wherein the step of modifying the displacement vector is based on a direction component of the second gaze vector.

8. The method of claim 6, wherein the difference between the displacement vector and the second gaze vector is lessened by an amount depending upon a skill level of the user.

9. The method of claim 6, wherein the target comprises a moving target, and wherein the second gaze vector is determined when the user is looking ahead of the moving target.

10. The method of claim 6, wherein the AR/VR engine is further configured to determine a position vector of a hand of the user, and enable a user control input to effect a pick up of the virtual object based on the first gaze vector and the position vector of the hand of the user being within a predetermined distance.

11. A computer product comprising a non-transitory computer usable medium including a computer-readable program which when executed on a computer configures the computer to:
determine a position vector of a virtual object to be picked up, determine a first gaze vector for eyes of a user, and enable a user control input to effect a pick up of the virtual object when the first gaze vector is less than a predetermined distance away from the position vector of the virtual object;
determine a displacement vector for a virtual object thrown at a target in response to physical input from the user;
determine a second gaze vector for eyes of the user using the eye-tracking system; and
modify the displacement vector so as to lessen a difference between the displacement vector and the second gaze vector.

12. The computer product of claim 11, wherein the displacement vector is modified based on a direction component of the second gaze vector.

13. The computer product of claim 11, wherein the difference between the displacement vector and the second gaze vector is lessened by an amount depending upon a skill level of the user.

14. The computer product of claim 11, wherein the target comprises a moving target, and wherein the second gaze vector is determined when the user is looking ahead of the moving target.

15. The computer product of claim 11, wherein the computer is further configured to determine a position vector of a hand of the user, and enable a user control input to effect a pick up of the virtual object based on the first gaze vector and the position vector of the hand of the user being within a predetermined distance.

* * * * *